United States Patent
Mandawewala

(10) Patent No.: US 10,287,714 B2
(45) Date of Patent: *May 14, 2019

(54) HYGRO MATERIALS FOR USE IN MAKING YARNS AND FABRICS

(71) Applicant: WELSPUN INDIA LIMITED, Mumbai (IN)

(72) Inventor: Rajesh R. Mandawewala, Mumbai (IN)

(73) Assignee: WELSPUN INDIA LIMITED, Mumbai (IN)

( * ) Notice: Subject to any disclaimer, the term of this patent is extended or adjusted under 35 U.S.C. 154(b) by 0 days.

This patent is subject to a terminal disclaimer.

(21) Appl. No.: 15/986,926

(22) Filed: May 23, 2018

(65) Prior Publication Data

US 2018/0266022 A1 Sep. 20, 2018

Related U.S. Application Data

(63) Continuation of application No. 15/619,572, filed on Jun. 12, 2017, which is a continuation of application
(Continued)

(51) Int. Cl.
*D03D 15/00* (2006.01)
*D03D 1/00* (2006.01)
(Continued)

(52) U.S. Cl.
CPC ............. *D03D 15/06* (2013.01); *A47K 10/02* (2013.01); *B32B 5/024* (2013.01); *B32B 5/26* (2013.01);
(Continued)

(58) Field of Classification Search
CPC ........ D03D 15/06; D03D 27/08; D03D 15/00; D03D 15/0027; D03D 1/0017;
(Continued)

(56) References Cited

U.S. PATENT DOCUMENTS 4,440,418 A 4/1984 Staufer
4,662,164 A * 5/1987 Morrison ............... D02G 3/367
19/243

(Continued)

FOREIGN PATENT DOCUMENTS

AU 75733/74 5/1976
CN 101012585 A 8/2007
(Continued)

OTHER PUBLICATIONS

English machine translation of JP 09-031781A, Feb. 4, 1997.
(Continued)

*Primary Examiner* — Robert H Muromoto, Jr.
(74) *Attorney, Agent, or Firm* — Finnegan, Henderson, Farabow, Garrett & Dunner LLP

(57) ABSTRACT

A process is described wherein pile yarn is woven with cotton weft and warp yarns to produce terry fabrics, such as towels. The fabric is then washed in warm water to dissolve the PVA fibers. The amount of fibers dissolved, depends upon the count of the yarn or yarns used. By dissolving the PVA fibers, a hollow air space is produced throughout the pile yarn, corresponding to an increase in the air space in the pile yarn. By increasing the air space in the pile yarn, the resulting towels are softer and bulkier than standard cotton towels. The present invention further relates to pile yarn in terry woven fabric (warp yarn), or weft yarn, in the case of flat fabrics.

22 Claims, 2 Drawing Sheets

Related U.S. Application Data

No. 14/274,680, filed on May 10, 2014, now Pat. No. 9,677,201, which is a continuation of application No. 11/581,722, filed on Oct. 16, 2006, now Pat. No. 8,733,075.

(60) Provisional application No. 60/727,424, filed on Oct. 17, 2005.

(51) Int. Cl.
| | |
|---|---|
| *D03D 15/06* | (2006.01) |
| *D02G 3/44* | (2006.01) |
| *D02G 3/38* | (2006.01) |
| *D02G 3/22* | (2006.01) |
| *D02G 3/02* | (2006.01) |
| *D02G 3/36* | (2006.01) |
| *D02G 3/40* | (2006.01) |
| *D03D 27/00* | (2006.01) |
| *D03D 27/08* | (2006.01) |
| *D06B 3/10* | (2006.01) |
| *D06C 19/00* | (2006.01) |
| *A47K 10/02* | (2006.01) |
| *B32B 5/02* | (2006.01) |
| *B32B 5/26* | (2006.01) |

(52) U.S. Cl.
CPC .............. *D02G 3/02* (2013.01); *D02G 3/22* (2013.01); *D02G 3/36* (2013.01); *D02G 3/38* (2013.01); *D02G 3/406* (2013.01); *D02G 3/44* (2013.01); *D03D 1/0017* (2013.01); *D03D 15/00* (2013.01); *D03D 15/0027* (2013.01); *D03D 15/0066* (2013.01); *D03D 27/00* (2013.01); *D03D 27/08* (2013.01); *D06B 3/10* (2013.01); *D06C 19/00* (2013.01); *D10B 2101/20* (2013.01); *D10B 2201/02* (2013.01); *D10B 2201/10* (2013.01); *D10B 2201/24* (2013.01); *D10B 2211/04* (2013.01); *D10B 2321/06* (2013.01); *D10B 2321/10* (2013.01); *D10B 2331/04* (2013.01); *D10B 2401/022* (2013.01); *D10B 2401/024* (2013.01); *D10B 2401/14* (2013.01); *D10B 2501/00* (2013.01); *D10B 2501/02* (2013.01); *D10B 2501/04* (2013.01); *D10B 2503/00* (2013.01); *D10B 2503/06* (2013.01); *D10B 2509/026* (2013.01); *Y10T 428/239* (2015.01); *Y10T 428/23979* (2015.04); *Y10T 428/23993* (2015.04); *Y10T 442/3073* (2015.04)

(58) Field of Classification Search
CPC ........ D03D 27/00; A47K 10/02; B32B 5/024; B32B 5/26; D02G 3/02; D02G 3/22; D02G 3/36; D02G 3/38; D02G 3/406; D02G 3/44; D06B 3/10
See application file for complete search history.

(56) References Cited

U.S. PATENT DOCUMENTS

| | | | | | |
|---|---|---|---|---|---|
| 4,711,079 | A | * | 12/1987 | Newton ................. | D02G 3/367 57/12 |
| 4,860,530 | A | * | 8/1989 | Montgomery ......... | D02G 3/367 57/5 |
| 4,896,406 | A | | 1/1990 | Weingarten et al. | |
| 4,941,884 | A | | 7/1990 | Green | |
| 5,058,628 | A | * | 10/1991 | Spiller ................. | D03D 39/223 139/102 |
| 5,336,543 | A | * | 8/1994 | Pyle ...................... | A47K 10/02 139/383 R |
| 6,015,618 | A | | 1/2000 | Orima | |
| 6,595,244 | B1 | * | 7/2003 | Sollars, Jr. ............ | B60R 21/235 139/389 |
| 6,734,124 | B2 | * | 5/2004 | Hurst .................... | B60R 21/235 280/728.1 |
| 6,803,332 | B2 | | 10/2004 | Andrews | |
| 7,069,961 | B2 | * | 7/2006 | Sollars, Jr. ............ | B60R 21/235 139/389 |
| 7,081,079 | B2 | * | 7/2006 | Baclija .................. | B65H 3/085 493/315 |
| 7,948,858 | B2 | * | 5/2011 | Kawamura ........... | G11B 7/1263 369/116 |
| 8,225,529 | B2 | * | 7/2012 | Simms .................. | A43B 5/185 36/135 |
| 8,733,075 | B2 | * | 5/2014 | Mandawewala ......... | D02G 3/36 57/5 |
| 9,677,201 | B2 | * | 6/2017 | Mandawewala ......... | D02G 3/36 |
| 9,677,202 | B2 | * | 6/2017 | Mandawewala ......... | D02G 3/36 |
| 9,677,205 | B2 | * | 6/2017 | Mandawewala ......... | D02G 3/36 |
| 9,683,318 | B2 | * | 6/2017 | Baumeler .............. | D03D 15/06 |
| 2002/0187345 | A1 | | 12/2002 | Andrews | |
| 2003/0108408 | A1 | * | 6/2003 | Hilario ................. | B23P 19/007 414/416.1 |
| 2004/0090542 | A1 | * | 5/2004 | Hirai .................... | G11B 27/034 348/231.99 |
| 2004/0128811 | A1 | * | 7/2004 | Mandawewala ....... | D02G 3/406 28/168 |
| 2004/0131821 | A1 | * | 7/2004 | Mandawewala ....... | D02G 3/406 428/97 |
| 2004/0159363 | A1 | * | 8/2004 | Foil, Jr. ................ | D03D 13/004 139/416 |
| 2004/0197557 | A1 | | 10/2004 | Eshraghi et al. | |
| 2005/0008470 | A1 | * | 1/2005 | Baclija .................. | B65H 3/085 414/736 |
| 2006/0098552 | A1 | * | 5/2006 | Kawamura ........... | G11B 7/1263 369/112.01 |
| 2006/0117332 | A1 | * | 6/2006 | Ochi ....................... | G11B 7/12 720/659 |
| 2007/0087162 | A1 | * | 4/2007 | Mandawewala ......... | D02G 3/36 428/97 |
| 2009/0025818 | A1 | * | 1/2009 | Hozumi ............... | D03D 1/0017 139/392 |
| 2009/0147661 | A1 | * | 6/2009 | Kawamura ........... | G11B 7/1263 369/112.27 |
| 2009/0317075 | A1 | * | 12/2009 | Mandai .................. | H04B 10/60 398/25 |
| 2011/0013502 | A1 | * | 1/2011 | Tatsu .................... | G11B 7/0903 369/112.03 |
| 2012/0076971 | A1 | * | 3/2012 | Debnath ................. | D02G 3/04 428/85 |
| 2014/0248461 | A1 | * | 9/2014 | Mandawewala ......... | D02G 3/36 428/76 |
| 2015/0104990 | A1 | * | 4/2015 | Mandawewala ......... | D02G 3/36 442/190 |
| 2015/0110992 | A1 | * | 4/2015 | Mandawewala ......... | D02G 3/36 428/85 |
| 2015/0284881 | A1 | * | 10/2015 | Yu ........................... | D02G 3/02 428/36.1 |
| 2016/0037977 | A1 | * | 2/2016 | Hozumi ............... | D03D 1/0017 139/391 |
| 2017/0275791 | A1 | * | 9/2017 | Mandawewala ......... | D02G 3/36 |
| 2017/0342609 | A1 | * | 11/2017 | Mandawewala ......... | D02G 3/36 |

FOREIGN PATENT DOCUMENTS

| | | |
|---|---|---|
| CN | 101161886 | 4/2008 |
| CN | 101165246 A | 4/2008 |
| CN | 101343810 A | 1/2009 |
| CN | 102888686 A | 1/2013 |
| CN | 203307526 U | 11/2013 |
| CN | 103860087 A | 6/2014 |
| CN | 103862819 A | 6/2014 |
| FR | 2 789 701 A1 | 8/2000 |
| JP | 73007898 | 3/1973 |
| JP | 51-49969 | 4/1976 |
| JP | 51-119853 | 10/1976 |

(56) References Cited

FOREIGN PATENT DOCUMENTS

| JP | 51-123342 | 10/1976 |
|---|---|---|
| JP | 52-70172 | 6/1977 |
| JP | 53-103063 | 9/1978 |
| JP | 58-169534 | 10/1983 |
| JP | 58169534 | 10/1983 |
| JP | 60-119248 | 6/1985 |
| JP | 86011347 | 4/1986 |
| JP | 61-138725 | 6/1986 |
| JP | 61 138725 | 6/1986 |
| JP | 62-162030 | 7/1987 |
| JP | 63-84668 | 4/1988 |
| JP | 63-125202 | 5/1988 |
| JP | 3-43034 | 2/1991 |
| JP | 4-108131 | 4/1992 |
| JP | 4-257326 | 9/1992 |
| JP | 4 257326 A | 9/1992 |
| JP | 4-361660 | 12/1992 |
| JP | 6-93531 | 4/1994 |
| JP | 06093531 A | 4/1994 |
| JP | 07097745 | 4/1995 |
| JP | 8-109534 | 4/1996 |
| JP | 9-29078 | 2/1997 |
| JP | 9-31781 | 2/1997 |
| JP | 9031781 A | 2/1997 |
| JP | 9-59839 | 3/1997 |
| JP | 11 160430 | 6/1999 |
| JP | 2000 239962 A | 9/2000 |
| JP | 2000-256929 | 9/2000 |
| JP | 2002-285442 | 10/2002 |
| JP | 2003-147650 | 5/2003 |
| JP | 2005-68596 | 3/2005 |
| WO | WO 97/49326 | 12/1997 |
| WO | WO 02/12602 | 2/2002 |

OTHER PUBLICATIONS

Dictionary of Fiber and Textile Technology, Hoechst Celanese Corporation, 1989, definition of "roving," pp. 132-133.
Search Report and Written Opinion for European Patent Application No. 06827946.2, dated Aug. 25, 2011.
Translation of JP H6-93531 (Hirai) (1994).
English translation of JP 62-162030A, Ito, Jul. 17, 1997.
dictionary definition of "combing," Complete Textile Glossary, Celanese Acetate LLC, 2001.
Machine translation of JP 200-239962 A (Feb. 11, 2009).
Machine translation of JP 06-093531 A (Feb. 11, 2009).

* cited by examiner

HYGRO MATERIALS FOR USE IN MAKING YARNS AND FABRICS

CROSS-REFERENCE TO RELATED APPLICATIONS

This is a continuation of U.S. patent application Ser. No. 15/619,572, filed Jun. 12, 2017, which is a continuation of U.S. patent application Ser. No. 14/274,680, filed May 10, 2014, now patented as U.S. Pat. No. 9,677,201, which is a continuation of U.S. application Ser. No. 11/581,722, filed Oct. 16, 2006, now patented as U.S. Pat. No. 8,733,075, which claims priority under 35 U.S.C. § 119(e) to U.S. provisional patent application 60/727,424, filed Oct. 17, 2005, all of which are incorporated herein by reference.

BACKGROUND

The word "Hygro" refers to the phenomenon of absorption of water or moisture by yarns and fabrics including towels and toweling fabrics. The fabrics Terry woven and Terry woven toweling are made from, for example, 100% cotton yarns; blends of cotton and viscose; blends of cotton, blends of silk and modal; bamboo fiber yarns; and blends of cotton and bamboo yarns. Flat fabrics, such as sheeting, may be made from 100% cotton; blends of polyester and cotton; blends of polyester and viscose; blends of cotton and modal; blends of cotton, silk and modal; and any combinations thereof.

Most fibers have absorbent properties, and the extent of absorption depends on the type of fiber, their blends and the structure of the yarn made thereof.

By suitable modifications in the yarn structure, it is possible to increase the wicking property of the yarn, in effect increasing the hydrophilic nature, thereby making the yarns quick absorbing and bulky.

The amount of twist in the yarn affects the properties of the towel products. The pile yarn is generally a low-twist yarn. Pile loops provide maximum surface area for the absorption of water, and the low twist aids in the absorption by imparting wicking properties to the yarn. Ground warp and weft are generally hard-twisted compared to the pile yarn. The ground and weft yarn twist factors generally range from about 3.8 to about 4.2, depending upon the towel construction. In contrast, the twist factor in the pile yarn generally ranges from about 3.2 to about 3.8. Similarly to the case of flat fabrics the twist factor for warp and weft range from about 3.8 to about 4.5.

Towels are generally thick materials. The thicker the towel, the greater the surface area, and thus a greater amount of water can be absorbed. When a towel fabric encounters a water droplet, the pile loops first remove the droplet by sucking the droplet between the space available among the pile loops and then absorbing the water inside the yarn in the space between the fibers in the yarn. The latter part is true to flat fabrics as well. The absorbed water then enters the lumen of the cotton fiber.

Normally the yarns used in terry fabrics are coarse and range from Ne (Number English) 8s to 30s in single as well as doubled configuration for pile, weft and ground yarns. The coarse yarn has a greater number of fibers in the cross section. Similarly the warp and weft yarn count, in the case of flat fabrics range from Ne. 12s to Ne. 100s in single as well as doubled configuration depending on the construction.

The yarns used in terry fabrics are all cotton except for yarns used in decorative designs and embellishments on the fabric. For example, the yarns used in towels are about 15-50 grams of a total towel weight of about 420-500 grams.

Decorative designs and embellishments are formed using polyester filament, polyester spun yarn, viscose filament yarn, viscose spun yarn, mercerized cotton yarn, modal yarns, chenille yarn, modified viscose yarn, and combinations thereof. Other flat fabrics such as sheeting are made from 100% cotton; blends of polyester and cotton; blends of polyester and viscose; blends of cotton and modal, blends of cotton and silk and modal; blends of cotton and bamboo; blends of cotton and sea weed fibers; blends of cotton and sliver fibers; blends of cotton and charcoal fibers; and any combinations thereof.

The greater the amount of free air space available within the yarn, the quicker and more complete the absorption of the water. Hence, to increase the amount of free space, (similarly as the air space increases the drying of the towel after absorption also increase) structural changes in the yarn have to be made.

Polyvinyl alcohol ("PVA"), a man made fiber, has the unique property of dissolving in hot water. This invention exploits the dissolving property of PVA by introducing PVA into blended yarns and, for example, the core of cotton yarn.

During the course of exploring possible method of introducing PVA into cotton yarn via cotton spinning system, three methods were considered.

a) Inserting PVA fibers into the core during ring spinning, by inserting PVA spun yarn into the stream of cotton fibers in the drafting zone during ring spinning. As there was a tendency of the cotton fibers in the outer sheath to slide and form bunches during the weaving process, this required further exploration.

b) Blending PVA fiber slivers along with cotton fiber slivers in the draw frame of a cotton spinning system. As the fibers were homogeneously blended in this process, the proper configuration of PVA fibers in the core could not be achieved.

c) Inserting PVA fiber slivers into the middle of cotton slivers at the feeding end of the drafting zone of the speed frame, twisting on the speed frame, and subsequently spinning the yarn at ring spinning. This was considered a potential system after trial and error refinements were made.

The current invention pertains to this successful process of inserting PVA fibers in the core of cotton sheath.

Therefore it is an object of the invention to provide a method for making a yarn that can be used to form soft terry fabrics or flat fabrics, which are highly hydrophilic in nature and bulky (herein referred to as "Hygro Towels" or "Hygro Toweling Fabrics" or "Hygro fabrics" or "Hygro flat fabrics"). Such highly hydrophilic yarns and fabrics can absorb, for example, between about 65% and 75% of the water contacting the yarn or fabric. In a preferred embodiment, the highly hydrophilic yarns and fabrics of the present invention can absorb between about 65% and 75% of the water contacting the yarn or fabric. In another embodiment the hydrophilic yarns and fabrics can absorb more than 75% of the water contacting the yarn or fabric.

It is a further object of the invention to provide a method for making Hygro Toweling Fabrics and Hygro flat fabrics.

It is a further object of the invention to provide terry fabrics and flat fabrics that are highly absorbent, quick drying, increase in bulk after drying, and have a lower tendency to lint.

DEFINITIONS OF TERMS

Figure 1:
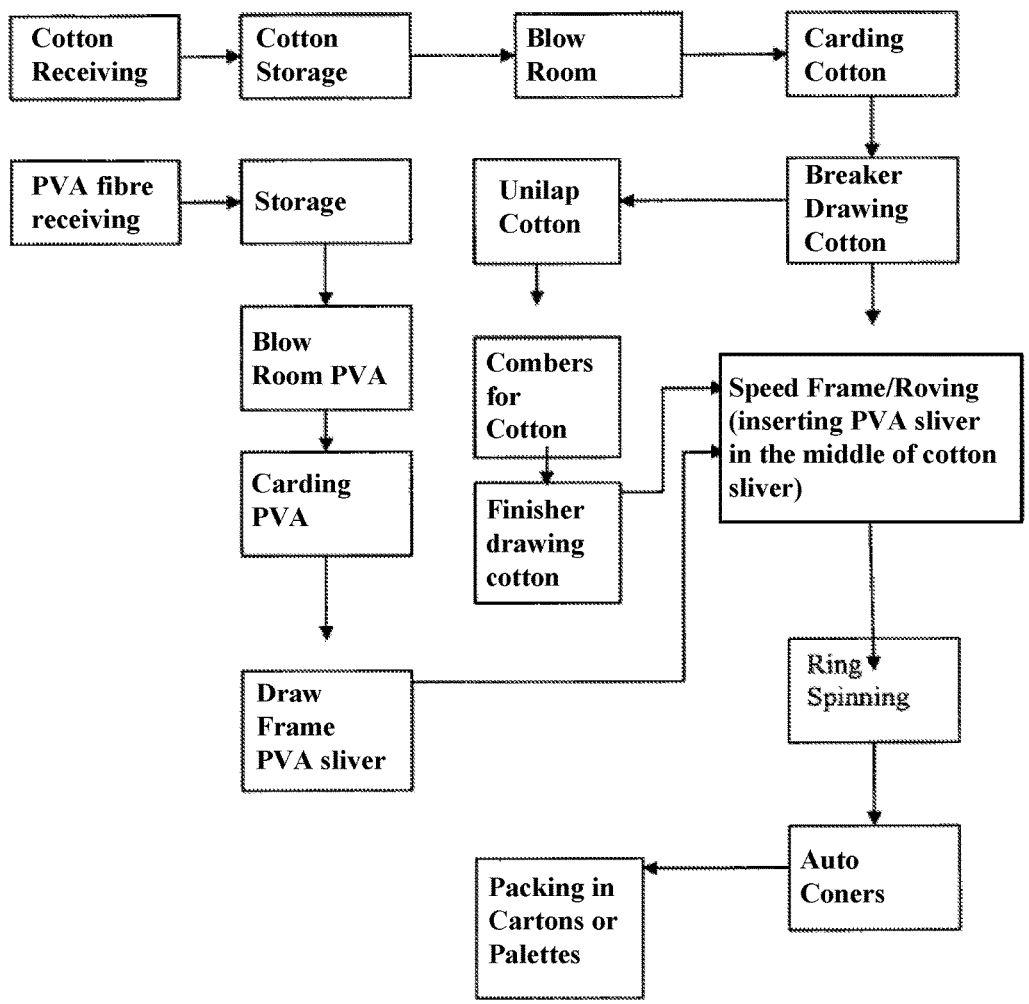
FIG. 1. Spinning Flow Chart for Hygro-Yarn Manufacturing.
Figure 2:
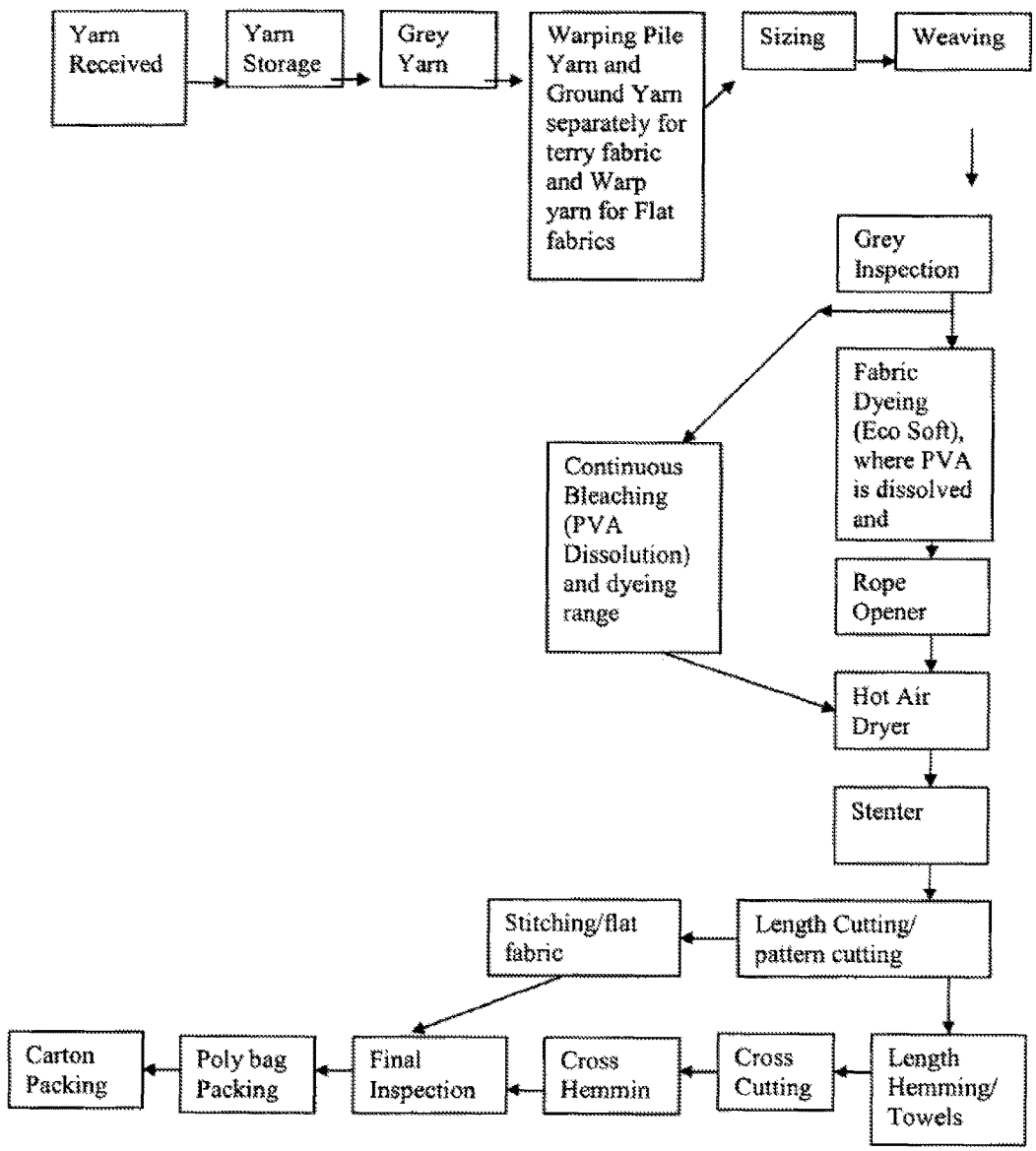
FIG. 2. Hygro-Toweling Fabric/Flat fabric Manufacturing Flow Chart.

Absorbency: The propensity of a material to take in and retain liquid, usually water.

Blend: A textile containing two or more different fibers, variants of the same fiber or different colors and grades of the same fiber.

Blending: The mixing of quantities of the same fiber taken from many lots or of different types of fiber to produce a uniform result.

Carding: A process in manufacturing spun yarn in which the fibers are separated, distributed, equalized and formed into a web. The web can be very thin or thick. The process of carding removes some impurities, and a certain amount of short or broken fibers.

Core Spinning: A yarn spinning process by which a filament (usually elastic under tension) is covered with a sheath of staple fibers to produce a stretchable yarn. The resultant yarn and fabric have the characteristics of the sheath fiber along with the advantage of stretch and recovery.

Core Yarn: A yarn made by winding one yarn around another to give the appearance of a yarn made solely of the outer yarn.

Denier: Refers to the thickness of a fiber. The measurement of the diameter of the fiber.

Hank: A definite length of textile material that varies according to the material. A hank of wool is 560 yards, cotton and silk is 840 yards, and linen is 300 yards.

Pile: A surface effect on a fabric formed by tufts or loops of yarn that stand up from the body of the fabric.

Spinning: The final step in the production of yarn. The twisting of the sliver or roving.

Warp: In woven fabric, the yarns that run lengthwise and are interwoven with the fill (weft) yarns.

Weft: In woven fabric, the filling yarns that run perpendicular to the warp yarns.

Yarn: a continuous strand of textile fibers created when a cluster of individual fibers are twisted around one another.

DETAILED DESCRIPTION OF THE INVENTION

The present invention relates to pile yarn in terry woven fabric (warp yarn), or weft yarn, in the case of flat fabrics. This pile yarn contains warm-water soluble fibers in its core, and cotton and/or other fibers on the outside. The warm-water fibers can be, for example, polyvinyl alcohol (PVA) fibers. Methods for making and using such yarns are described.

A process is described wherein pile yarn is woven with cotton weft and warp yarns to produce terry fabrics, such as towels. The fabric is then washed in warm water to dissolve the PVA fibers. The amount of fibers dissolved, depends upon the count of the yarn or yarns used. The amount of PVA present can vary from about 8% to about 25% of the weight of the yarn. For example, the PVA may be present as 8%, 10%, 12%, 14%, 16%, 18%, 20%, 22%, or 24% of the weight of the yarn. Furthermore, the PVA may be present as 9%, 11%, 13%, 15%, 17%, 19%, 21%, 23%, or 25% of the weight of the yarn. By dissolving the PVA fibers, a hollow air space is produced throughout the pile yarn, corresponding to an increase in the air space in the pile yarn. By increasing the air space in the pile yarn, the resulting towels are softer and bulkier than standard cotton towels.

In the case of flat fabrics the warp and/or weft yarn similarly contain warm-water soluble fibers, such as polyvinyl alcohol (PVA) fibers, in its core with cotton and or other fibers on the outside (surrounding the core). This increases the air space throughout the yarn, thereby making the fabric, bulkier and softer.

The fabrics and yarns of the present invention can absorb, for example, between about 65% and 75% of the water contacting the yarn or fabric. In a preferred embodiment, the highly hydrophilic yarns and fabrics of the present invention can absorb between about 65% and 75% of the water contacting the yarn or fabric. In another embodiment the hydrophilic yarns and fabrics can absorb more than 75% of the water contacting the yarn or fabric.

I. Pile Yarn of Toweling Fabric and Warp-Weft Yarn of Flat Fabric

The pile yarn herein described typically contains cotton fibers and a fiber, which dissolves in warm water, such as PVA (Polyvinyl Alcohol). The PVA core yarn is used only in the pile of the towel or toweling fabric. Whereas in the case of a flat fabric, such as sheeting, warp and/or weft yarn can be of a PVA core configuration.

The cotton that forms the outer surface of the pile yarn or warp-weft yarn of terry fabric can be of any origin; for example, Indian, Egyptian, Australian, United States of America (USA), Syria, or Russia. In place of cotton, the pile yarn may contain cotton blends, silk fibers, modal fibers, acrylic fibers, blends of cotton and bamboo; blends of cotton and sea weed fibers; blends of cotton and sliver fibers; blends of cotton and charcoal fibers; and any combinations thereof. The warp-weft yarn in flat fabrics may have blends of polyester and cotton; blends of polyester and viscose; blends of cotton and modal; blends of cotton; silk and modal; blends of cotton and bamboo; blends of cotton and sea weed fibers; blends of cotton and sliver fibers; blends of cotton and charcoal fibers; and any combinations thereof. The sheath, or outer covering of the yarn or fabric may be 100% cotton or a combination of any of the foregoing blends.

PVA is a synthetic polymer available in the form of filaments and cut fibers. PVA fibers are easily dissolved in warm or hot water at about 50° C. to 110° C. without the aid of any chemical agents.

TABLE 1

PROPERTIES OF CUT STAPLE FIBERS AVAILABLE FOR MANUFACTURE OF SPUN PVA YARN

| Type | Nominal Dissolving Temp. in Water (Lowest Temp) (° C.) | Fineness (dtex) | Cut length (mm) B = variable cut length | Tenacity (cN/dtex) | Elongation (%) |
|---|---|---|---|---|---|
| 1 | 20 | 1.7 | 38 | 5 | 20 |
|   |    | 2.2 | 51 |   |    |
| 2 | 40 | 1.2 | 38 | 7 | 15 |
|   |    | 1.7 | 38 |   |    |
|   |    | 2.2 | 38, 51, 75B |   |    |
| 3 | 50 | 1.7 | 32, 38 | 7 | 15 |
|   |    | 2.2 | 32, 38, 51, 75B, 85B |   |    |

TABLE 1-continued

PROPERTIES OF CUT STAPLE FIBERS AVAILABLE
FOR MANUFACTURE OF SPUN PVA YARN

| Type | Nominal Dissolving Temp. in Water (Lowest Temp) (° C.) | Fineness (dtex) | Cut length (mm) B = variable cut length | Tenacity (cN/dtex) | Elongation (%) |
|---|---|---|---|---|---|
| 4 | 70 | 1.7 | 38 | 7 | 12 |
|  |  | 2.2 | 51 |  |  |
| 5 | 80/90 | 1.4 | 32, 38 | 8 | 11 |
|  |  | 1.7 | 32, 38 |  |  |
|  |  | 2.2 | 51, 85B |  |  |
|  |  | 2.2 | 75B | 7 | 15 |
| 6 | 95 | 1.7 | 38 | 9 | 10 |
|  |  | 2.2 | 51, 75B |  |  |

II. Method of Making the Pile Yarn/Warp-Weft Yarn

Method of Forming PVA Sliver

The PVA fibers are first processed through a blow room in the cotton spinning system. It is here that the fibers are made into slivers through the process of carding and use of a draw frame (one or two passages as required in order to ensure uniformity of fibers in the stream). The range of PVA sliver hank is from 0.05 to 0.40. The hank being the weight per unit length of the sliver as per the number English System of Count Notation.

A PVA fiber sliver is made on the draw frame with a finer hank greater than or equal to 0.05 hank. The denier of the PVA fibers is typically from about 0.9 to about 2.2 denier. It has a cut length that is equal to or more than 32 mm and equal to or shorter than 51 mm. (44 mm and 51 mm fiber can be used with modifications tin the machine parameters in spinning) The PVA fiber dissolves in water at a temperature from about 50° C. to 110° C.

Method of Forming Sliver from Fibers Forming the Outer Covering

The outer cover sliver (sheath) may be made from, for example, cotton blends, silk filers, modal fibers, acrylic fibers; blends of cotton and bamboo; blends of cotton and sea weed fibers; blends of cotton and sliver fibers; and blends of cotton and charcoal fibers. The warp-weft yarn in flat fabrics may have blends of, for example, polyester and cotton; blends of polyester and viscose; blends of cotton and modal; blends of cotton and silk and modal; blends of cotton and bamboo; blends of cotton and sea weed fibers; blends of cotton and sliver fibers; blends of cotton and charcoal fibers, and any combinations thereof. In case of blended sliver, each component is separately processed through carding and the individual carded slivers are subsequently blended together on draw frames.

The cotton sliver may contain cotton from any country of origin, including India, Egypt, Australia, US, Syria, and Russia. The cotton sliver is prepared by processing through the blow room, carding, draw frames, combers, and final draw frames, producing a 0.05 hank sliver and above.

After carding, the cotton sliver is subjected to combing to remove short fibers. The amount of noil, or fibers that are less than 12 mm, removed ranges from 7% to 24% of the weight of the feed material. For example, the weight can be 8%, 10%, 12%, 15%, 16%, 18%, 20%, 22%, 24% of the weight of the feed material.

Configuring PVA Fibers in the Core

It is to be understood that a combination of blends may be used in the place of 100% cotton in the outer cover as mentioned earlier. Configuring the PVA fibers in the core of the cotton yarn (and other fibers) makes the Hygro yarn. This can be accomplished in a variety of ways. In one embodiment, the PVA fibers are added on the core-spinning machine. Here, the PVA roving is fed in the path of the cotton roving in the drafting zone of the ring frame.

In a second embodiment, PVA roving is introduced in the path of cotton roving on the roving machine. Alternatively, the PVA can be added to the middle of the cotton roving by reversing the rotation of flyer in the counter-clock-wise direction, which is opposite the direction of the normal flyer rotation (i.e. the clockwise direction). In both situations, the PVA fibers are placed in the middle of the cotton sliver during the process of manufacturing the roving on the roving machine. The sliver is a continuous strand of loosely assembled fibers without twist. The production of the sliver is the first step in the textile operation that brings the staple fiber into a form that can be drawn and eventually twisted into a spun yarn.

Suitable arrangements, such as guide pulleys on a roving machine creel, are made for guiding the PVA sliver and the cotton sliver from the drawing cans at the creel side of the speed frame. Specially designed condensers are incorporated for feeding PVA sliver at the inlet, and at the back and middle zones of the drafting system on the speed frame, to ensure that the PVA sliver always stays in the middle of the cotton sliver.

The twisting of the roving with PVA fibers in the middle is done in the normal fashion, i.e. with clock-wise rotation of the flyer to give 'Z' twist. Alternatively, the roving can have a 'S' twist, by reversing the direction of the rotation of the flyer to a counter-clockwise direction.

The roving produced by these methods has a twist multiplier to optimize the working conditions. The roving hank ranges from about 0.5 to about 5.0 hanks.

Spinning the PVA Core Roving

It is to be understood that a combination of blends may be used in the place of 100% cotton in the outer cover as mentioned earlier. The yarn is spun on ring frames using the normal settings. For example, all of the setting parameters or ring frame are determined based on the type of PVA fibers and other fibers used to make the yarn. The yarn spun on the Ring Spinning has a count ranging from about Ne 8s to about 30s for terry fabrics and about Ne. 10s to about 100s for flat fabrics. Where doubled yarn is to be made, two single yarns are doubled on two-for-one twisters with a TPI (twists per inch) from about 6.5 to about 14.5 TPI in 'S' direction. The twist direction can be Z over S or Z over Z. The resultant counts would be about 2/8s to about 2/30s, for terry fabrics. Similarly the doubled yarns for flat fabrics may be from about 10/2's to about 100/2s with about 50% to about 85% of single yarn TPI as doubled yarn TPI in either Z over S or Z over Z configuration. The cut length of the PVA fibers is about 32 mm, 38 mm and 44 mm (with longer middle cradle in the drafting zone) which can be used for spinning in the cotton system. The machinery settings depend on the fiber length and the settings will be as per the recommendation of the machine manufacturer for these lengths.

The processing parameters depend on the PVA fiber and cotton used and/or other fibers used in the blend.

The ring spun yarn is wound into large packages on the Auto coner using suitable settings and process parameters.

III. Method of Making Hygro Towels

Terry towels are formed from three types of yarn. The first type of yarn is the ground warp. The ground warp is the longitudinal set of yarn forming the base fabric. The second type of yarn is the pile warp. The pile warp is placed in the longitudinal direction and produces the pile loops on the towel surface. The pile loops provide a large surface area for maximizing the absorption of water. The third type of yarn is the weft yarn. The weft yarns are laid perpendicular to the pile yarns, and interlace with pile or ground yarn to form the fabric of the towel. The ground and the weft yarns are standard cotton yarns that are generally used in towel manufacturing processes.

Production of the Weft and Ground Yarns (for Terry Fabrics)

The ground yarn has a count ranging from about Ne 2/12s to about Ne 2/30s and from about Ne 10s to about Ne 16s combed or carded. In the preferred embodiment, the ground yarn is about 2/24s carded. The weft yarn, has a count ranging from about Ne 8s to about Ne 30s both carded/combed, Ring and OE yarn. OE stands for Open End, spinning a different spinning technique of making yarn other than the ring spun yarn, wherein the yarn is made directly from sliver by using rotor-spinning technology. In the preferred embodiment the weft is about 11s OE/carded.

The Twist Multiplier for weft yarn and ground yarn is from about 3.4 to about 4.2 Z twist. The weft and ground yarn may be dyed. The dyed or grey ground yarn is then sent to warping to weaving.

Weaving of Pile, Weft, and Ground Yarns (Terry Fabrics)

The ground, weft, and pile yarns are woven together under normal conditions. The terry fabric can be made on 56, 60, 70 reeds; however, reed space is not a limiting factor.

The terry weave can be 3 pick, 4 pick, 5 pick, 6 pick terry. In the normal embodiment, the weave is 3 pick terry. The pile height can range from about 4.0 to 7.5 mm.

For the flat fabrics, the method of production of Hygro yarn for Warp and or weft is similar to that described under "Method of Making the Pile Yarn/Warp-Weft Yarn" above.

The weaving of flat fabrics with Hygro Warp and or Hygro weft is similar to that explained above, the fabric construction depending on the type of fabric to be made.

Dissolving the PVA Fiber (Applicable to Both Terry and Flat Fabrics)

After the weaving is completed, the fabric roll is scoured and dyed in the normal fashion in a fabric dying machine. While scouring, bleaching and dyeing, the operating temperature range from about 95° C. to about 120° C. In the preferred embodiment, the temperature is about 120° C. (to ensure that all the PVA dissolves).

The Honor ratio is a ratio of the material (weight) to water (volume). The liquor ratio should be sufficient to facilitate prompt dissolution of the PVA, while allowing free movement of the fabric. The liquor ratio ranges from about 1:5 to about 1:30. For example, the liquor ratio may be 1:10, 1:12, 1:15, 1:20, 1:25, 1:22, or 1:28. In the preferred embodiment the liquor ratio is 1:10.

The material is typically wound into the shape of a rope prior to entering the fabric-dyeing machine. The rotation of the material is essential to promote rapid dissolution of PVA. A continual overflow of water is also desired.

After washing, the liquor is drained and fresh water is injected for rinsing to eliminate all the dissolved PVA. The water is at a temperature ranging from about 55° C. to about 100° C. Preferably, the water is at a high temperature, such as 100° C. The PVA coagulates during the dissolving step and promptly dissolves in hot water if the high temperature is not maintained. Therefore, the fabric is rinsed in hot water after draining to wash away any PVA residue. This rinsing step also ensures that any loose fibers drain out along with the drain water.

Drying and Straightening the Fabric

After unloading the material from the washing and rinsing vessel, the material is hydro-extracted in a Hydro-extractor in the standard manner to reduce the moisture from 200% to 60%. A rope is passed through rope opener, which is equipped with drumbeaters both at feed and delivery ends, to straighten the twist in the rope. Then the material is passed two times through a hot air dryer (e.g. Alea) which is equipped with drumbeaters at both the feed and delivery ends. This ensures proper lifting of the pile. The first drying is carried out at about 120° C. The second drying occurs at a higher temperature, such as 150° C. for about 4 minutes to about 5 minutes. The full width fabric is then passed through hot air stenter and a weft straightener to straighten the fabric and return it to its proper dimensions.

Conditioning (Optional)

The towels are then passed through the shearing machine on both the sides. The blade/laser on the shearing machine is set such that only protruding fibers are cut, and the piles are not cut. This ensures reduced linting during washing of towel subsequently. This process is optional depending on the amount of protruding fibers The fabric is then carried through length cutting, length hemming, cross cutting, cross hemming, chocking, folding, and packing according to the standard practice.

The method of processing can also be continuous bleaching and continuous dyeing range followed by hot air drying and stentering. Care is to be exercised to ensure that the PVA dissolves completely, during the process. The other conditions of processing remains as described above for terry fabrics. The following show the sequence of operations.

Pre Treatment Range (PTR)
Impregnation chamber
Steamer
The above two processes are for de sizing and PVA dissolution
Two compartment Washing
Impregnation chamber and steamer for bleaching
Three compartment washing.
Neutralizing range
Continuous Dyeing Range (CDR)
Cooling cylinders
Padders/steamer
Thee washing compartments (one of them for Oxidizing in the case of Vat colors)
Soaping
Two washing compartments
Neutralizing and softening.

IV. Uses for Hygro Terry Fabrics Flat Fabrics

The terry fabrics are typically used to form towels wash clothes, robes however they may also be used in undergarments, sweaters and baby articles, or other articles that require absorbent fabrics The flat fabrics can be for sheeting, table cloths and or for apparels.

The Hygro toweling fabrics and flat fabrics have low thermal conductivity, and thus produce a warm feeling when pressed against the body. The towel fabric and the flat fabric are more voluminous and lighter than standard cotton towels or fabrics.

The Hygro-yarn in the pile, warp, and weft, in the case of flat fabric, has a large amount of air space within the yarn structure, which permits easy air circulation. The air space provides room to absorb and vaporize water. Thus the fabric is highly absorbent and quick drying, having a decreased likelihood of mildew formation. Typically the fabrics are 30% more absorbent and quick drying compared to normal toweling fabrics/flat fabrics. When tested in the sinking method, the toweling fabric takes less than 5 seconds to absorb the water, whereas other towels take 10 seconds or more. Testing method AATCC-79 (American Association of Textile Chemists and Colorists). The AATCC-79 is a test to measure the sinking time required for a droplet of water. The result of the test is usually measured in the number of seconds that it takes for a drop of water to sink. The diminishing of the droplet, until it vanishes entirely leaving only a dull wet spot, is analyzed for measuring the absorbency.

In the surface wetting method the toweling fabric absorbs 65-75% water compared to 50-55% of normal toweling fabric (using ASTM D-4772). The ASTM D-4772 method measures the amount of water completely absorbed by the specimen placed in an embroidery hoop at a 60° angle. The amount is calculated in milliliters, by pouring 50 ml of distilled/demonized water and measuring the collected unabsorbed water in a beaker placed at the bottom of the inclined frame. In the soaking method, where the sample is totally immersed in water, taken out to drip and then weighed, the sample weighs 4 times its original weight; in other words, 400% absorption.

The following non-limiting examples and data illustrate various aspects and features relating to the methods and compositions of the present invention. While the utility of this invention may be illustrated through the use of several methods, it will be understood by those skilled in the art that comparable results are obtainable with various other methods, as are commensurate with the scope of this invention.

EXAMPLES

The following details illustrate typical pile yarn manufacturing parameters, towel construction parameters, and processing details.

Pile Yarn Manufacturing Parameters

The PVA fiber used in this example is 1.4 denier×38 mm fiber and Shankar 6 cotton of Indian origin with 2.5% span length of 28 to 32 mm, micronaire of 3.6 to 4.2, fibre strength of 21 Gtex to 24 Gtex, uniformity ratio of 45 to 47% and short fibre index 3.5 to 5.5. The cotton and PVA fibers were blended to produce a pile yarn containing 80% S-6 Combed Sliver (18% Noil) and 20% PVA (1.4 denier).

The spinning process parameters and yarn properties for PVA/Cotton Pile Yarn are described below.

Cotton Sliver Preparation (Combed):

The cotton used for the preferred embodiment of Ne13's is Shankar-6 having the following parameters:

2.5% span length: 28 to 32 mm
Micronaire: 3.6 to 4.2
Fibre Strength: 21 to 24 gtex.
Uniformity ratio: 45 to 47.
Short fibre index: 3.5 to 3.5%.

The cotton is processed through blow room having bale plucker, Axiflow, Multimixer, CVT3 beater and dustex.

The cotton is processed from blow room through to carding where the fibres are individualized. The hank of the card sliver is maintained at 0.1 with a delivery speed of 145 mtr/minute.

The cotton sliver from carding is then processed through a breaker drawing where at the feed end the number of doublings are 6 and a hank delivered kept at 0.12. The delivery speed is 450 mtrs per minute.

Since combing is necessary to remove short fibres, the draw frame slivers are processed through Unilap machine with 24 doublings and formed into a lap of 75 gms/mtr.

The lap is processed on the combing machine with 6 heads and one delivery resulting in a sliver hank of 0.12. The combers are worked at 350 nips/minute with a forward feed of 5.2 mm per nip. The extracted noil is 18%.

The combed cotton sliver is then passed through a finisher draw frame with a feed hank of 0.12, 7 ends up, with a delivery hank of 0.75 and speed of 400 mtr/minute. The sliver hank is kept coarse at 0.075 in order to have complete covering of the PVA fibre stream during roving preparation.

PVA Sliver Preparation.

The PVA fiber used is 38 mm×1.4 denier. The PVA fibers are first passed through blow room having a feeder and a mono cylinder beater only. This is because the PVA fiber is man made fiber and is clean with out any impurities.

The PVA fibers from blow room goes to the carding machines where the cards are run at 110-mtrs/minute-delivery speed and a hank of 0.13. On the cards the flat speeds are kept low at 90 to 110 mm per minute to minimize wastage.

The card sliver (PVA) is then processed through breaker draw frame with 6 ends up and a delivery hank of 0.14. The machine is run at 300 mtr per minute.

A second passage drawing in Finisher draw frame with 4 ends up and a delivery hank of 0.30 is given for making the fibres more parallel with one another. The delivery hank is kept fine at 0.3 to enable the PVA sliver occupy middle portion on the cotton sliver while being passed on to the speed frame. The delivery speed is kept at 250 to 300 mtr/minute.

Inserting the PVA Sliver in the Middle of Cotton Sliver and Twisting on Speed Frame:

The finisher draw frame sliver cans of both cotton and PVA are kept at the feed end of the speed frame. The cotton sliver has a normal path from the back to front, whereas the PVA sliver passes through a special feed guide, a inlet condenser before occupying the middle portion on the cotton sliver in the main feed condenser of the speed frame drafting system.

A specially designed middle condenser is also incorporated in the back zone of the drafting system to retain the PVA sliver in the middle of the cotton sliver.

When this combination of cotton and PVA sliver emerge out of the drafting zone on the speed frame, due to twist flowing from the flyer to the nip of the front rollers of she drafting zone, the PVA sliver gets wrapped up by the surrounding cotton, thus pushing the PVA sliver in the core.

The twisting and winding on to the bobbin on speed frame is normal as with any other cotton system. The hank of roving is 0.58.

Ring Spinning:

The core roving so produced on the speed frame is then spun into yarn on the cotton ring spinning frame. In the preferred embodiment Ne 13s the roving of 0.58 hank is drafted 22.41 times on the drafting system of ring frame and spun into yarn with 13.8 TPI. The machine is generally run at 10000 to 13000 rpm. In the preferred embodiment the speed is 10000 rpm.

The yarn from Ring Frame bobbins is wound into large packages on the Autoconers.

The PVA Core Yarn Parameters Before Dissolution of PVA:

The following enumerates the properties of the preferred embodiment Ne 13s core spun yarn with PVA in the core and cotton sheath.

Average count: 13.00
Average lea strength lbs: 208.0
CSP (Count strength product): 2705
Count CV %: 1.32

Strength CV %: 5.03
Average TPI: 13.87
Average U % (percent mean deviation): 8.46
Thin places/Km (−50%): 0.1
Thick places/Km (+50%): 8.9
Neps/Km (+200%): 9.0
Total imperfection/km: 17.9
Hairiness Index: 9.32
Average breaking force (gms): 634
Average RKm (Nm/kgt): 15.77
Rkm CV %: 9.60
Elongation at break %: 5.81
Elongation CV %: 9.31
Bleaching and Dyeing Processes.

The towels with PVA core spun yarn in the pile and cotton yarn in weft and ground is processed in the dyeing house in rope form. The bleaching can be either in a continuous bleaching range or a ecosoft dyeing machine. In either case the bleaching is with Hydrogen Peroxide with a liquor ratio of 1:8 and vessel capacity of 50 kgs (1:15, 1:20, 1:30 can also be considered depending on the capacity of vessel). The bleaching is for duration of 30 minutes at 100° C. After the bleaching, the bleached honor is drained at 100° C. itself in order to drain all the dissolved PVA during the process.

After bleaching an Alkali boil is given with Caustic lye of 48% strength, 600 gms for 50 kgs and 1:8 liquor ratio for a period of 20 minutes at 100° C.

This is followed by scouring with 44 gms of Emclean-CP, 88 gms of Miratol-Wa, Caustic Soda Lye 48%—525 gms and Hydrogen Peroxide—438 gms for a period of 30 minutes at 100° C. A hot wash with Sodium Hexmeta Phosphate—175 gms is given for a period of 10 minutes at 100° C. Peroxide killer Em-Orc—88 gms is used for 20 minutes at 100° C. followed by neutralization in Acetic Acid—88 gms for 10 minutes at 100° C.

The dyeing is carried out in the ecosoft machine with following dyes and chemicals for 2 hours at 60° C. The dyes used are Ciba EN/K class bi-reactive/bi-functional.
Typical Example:
a) Ciba Blue Fnr Cibacron: 3 gms.
b) Ciba Yellow Fn2r (Cibacron): 11 gms
c) Ciba Red (Fn2bl (Cibacron): 7 gms
d) Sodium Hexameta Phosphate: 175 gms
e) Sodium Sulphate: 3500 gms
f) Soda Ash Light: 875 gms
g) Caustic Soda Lye—48%: 263 gms
After dyeing the bath is neutralized with Acetic Acid—438 gms at 60° C for 10 minutes. This is followed by soaping with Miranon Ama—88 gms and Sodium Hexameta Phosphate—175 gms for 10 minutes at 60° C. and further neutralized by treating with Riddix Ana—88 gms and Acetic Acid—88 gms followed by softener treatment with Turbulant 86—438 gms and Tobler-Csi—525 gms for 10 minutes. The properties for the towels formed using the pile yarn described above are provided in Tables 2-4.

TABLE 2

| On loom specifications | |
| --- | --- |
| Reed space for terry | 81.48 cm |
| Reed space for towel | 86.48 cm |
| Number of towels per Reed Space | 3 |
| Pile Ratio | 7.01 |
| Pile height | 6.4 mm |
| Reed/cm | 11.02 |
| Picks/Inch | 41.91 |
| Type of Terry | 3 pick |
| Rpm | 380 |
| Finished Reed/inch pile | 32.56 |
| Pile Yarn count | 13 s Hygro |
| Weft Yarn Cout | 11 s OE (18.9 TPI) |
| Ground Yarn Count | 11 OE (16.9 TPI) |

The properties of the fabric when it is removed from the loom, i.e. the grey towel, are listed in Table 3.

TABLE 3

| Grey Towel Specifications | |
| --- | --- |
| Grey width | 79.04 cm |
| Grey length | 137 cm |
| Weight of towel | 567.48 g |
| Plain portion in width | 5 cm |
| Plain portion in length | 8 cm |
| Terry portion in length | 120.8 cm |
| Selvedge to selvedge width | 84.04 cm |

The properties of the finished soft terry towel are listed below in Table 4.

TABLE 4

| Finished Terry Towel Specifications | |
| --- | --- |
| Dimensions | 69 cm × 127 cm |
| Plain portion in width | 5.0 cm |
| Terry portion in width | 67.8 cm |
| GSM | 518 |
| Weight of finished towel | 453.927 g |
| Weight of Grey Towel | 567.48 g |
| Weight loss (%) | 20% |
| Plain portion in length | 2.4 cm |
| Design portion in length | 10.8 cm |
| Terry portion in length | 120.8 cm |
| Shrinkage (%) | 20.18% |
| Finished width of towel | 72.60 cm |

It is understood that the disclosed invention is not limited to the particular methodology, protocols, and reagents described as these may vary. It is also to be understood that the terminology used herein is for the purpose of describing particular embodiments only, and is not intended to limit the scope of the present invention, which will be limited only by the appended claims.

I claim:

1. A terry fabric, the terry fabric comprising:
   a longitudinal ground yarn;
   a perpendicular weft yarn interlaced with the longitudinal ground yarn to form a portion of base fabric; and
   a plurality of pile loops at a surface of the base fabric;
   wherein the pile loops are comprised of hollow pile yarn having an air space within the hollow pile yarn.

2. The terry fabric of claim 1, wherein the hollow pile yarn has weight per unit length between 8%-25% less than a pile yarn of similar cross-section and twists per inch, but not having an air space.

3. The terry fabric of claim 1, wherein the hollow pile yarn has weight per unit length between 8%-25% less than the weft yarn.

4. The terry fabric of claim 1, wherein the hollow pile yarn has weight per unit length between 8%-25% less than the ground yarn.

5. The terry fabric of claim 1, wherein the weft yarn, the ground yarn, and the pile yarn comprise cotton fibers.

6. The terry fabric of claim 1, wherein the weft yarn, the ground yarn, and the pile yarn consist of cotton fibers.

7. The terry fabric of claim 1, wherein the weft yarn, the ground yarn, and the pile yarn each has Number English (Ne) between 8s-30s, in either single or doubled configuration.

8. The terry fabric of claim 1, wherein a pile height of the terry fabric is less than 7.5 mm.

9. The terry fabric of claim 8, wherein the pile height of the terry fabric is at least 4.0 mm.

10. The terry fabric of claim 9, wherein the pile height of the terry fabric is between 4.0 mm-6.4 mm.

11. The terry fabric of claim 1, wherein a ratio of a length of the hollow pile yarn to a length of the terry fabric is 7.01 or less.

12. The terry fabric of claim 1, wherein the terry fabric has a water droplet sinking time measured according to AATCC-79 of less than 5 seconds.

13. The terry fabric of claim 1, wherein the terry fabric has a surface water absorption measured according to ASTM D-4772 of at least 75%.

14. The terry fabric of claim 1, wherein a grams per square meter of the terry fabric is 518 or more.

15. The terry fabric of claim 1, the terry fabric having greater than 40 picks/inch.

16. The terry fabric of claim 1, wherein the weft yarn, the ground yarn, and the pile yarn are twisted in an S or Z direction.

17. The terry fabric of claim 1, wherein the weft yarn and the ground yarn have a twist factor less than 4.2.

18. The terry fabric of claim 17, wherein the weft yarn and the ground yarn have a twist factor between 3.8-4.2.

19. The terry fabric of claim 1, wherein the pile yarn has a twist factor less than 3.8.

20. The terry fabric of claim 19, wherein the pile yarn has a twist factor between 3.2-3.8.

21. The terry fabric of claim 1, wherein a terry weave of the terry fabric is one of 3 pick, 4 pick, 5 pick, or 6 pick.

22. The terry fabric of claim 21, where the terry weave of the terry fabric is 3 pick.

* * * * *